United States Patent [19]

Leigh

[11] Patent Number: 5,835,767
[45] Date of Patent: *Nov. 10, 1998

[54] METHOD AND APPARATUS FOR CONTROLLING AVAILABLE PROCESSOR CAPACITY

[75] Inventor: James J. Leigh, Wyncote, Pa.

[73] Assignee: Unisys Corporation, Blue Bell, Pa.

[*] Notice: This patent issued on a continued prosecution application filed under 37 CFR 1.53(d), and is subject to the twenty year patent term provisions of 35 U.S.C. 154(a)(2).

[21] Appl. No.: 293,468

[22] Filed: Aug. 19, 1994

[51] Int. Cl.⁶ .................................................... G06F 9/46
[52] U.S. Cl. ......................... 395/674; 395/670; 395/672
[58] Field of Search .................................. 395/650, 700, 395/672, 675, 673, 674, 670; 364/200, 230

[56] References Cited

U.S. PATENT DOCUMENTS

| | | | |
|---|---|---|---|
| 4,377,000 | 3/1983 | Staab | 371/11 |
| 4,446,525 | 5/1984 | Hoch et al. | 364/474 |
| 4,581,486 | 4/1986 | Matthews et al. | 179/18 B |
| 4,779,194 | 10/1988 | Jennings et al. | |
| 4,796,178 | 1/1989 | Jennings et al. | |
| 4,907,167 | 3/1990 | Skeirik | 364/500 |
| 5,003,464 | 3/1991 | Ely | 364/200 |
| 5,010,482 | 4/1991 | Keller et al. | |
| 5,131,087 | 7/1992 | Warr | 395/425 |
| 5,155,729 | 10/1992 | Rysko | 371/9.1 |
| 5,168,566 | 12/1992 | Kuki | 395/650 |
| 5,193,172 | 3/1993 | Arai | 395/425 |
| 5,257,372 | 10/1993 | Furtney | 385/650 |
| 5,283,902 | 2/1994 | Dorn | 39/725 |
| 5,327,548 | 7/1994 | Hardell | 395/425 |
| 5,446,894 | 8/1995 | Demar et al. | 395/650 |
| 5,450,318 | 9/1995 | Mowers et al. | 364/410 |

OTHER PUBLICATIONS

"Dynamic Load Balancing in a Distributed System Using a Send" Local Computer Networks, 1988 13th Conference.
"A Task Algorithm for Load Balancing in a Distribute" System Sciences 1989 Annual Hawaii Int'l Conference vol. V.

*Primary Examiner*—Lucien U. Toplu
*Assistant Examiner*—Alice Park
*Attorney, Agent, or Firm*—John B. Sowell; Mark T. Starr; Steven B. Samuels

[57] ABSTRACT

A method and system are disclosed for limiting the processing power of a CPU or CPUs in a multi-processing system comprising at least one constrained or hobbled CPU and a main memory. The novel method includes executing a high priority process on the CPU which effectively interrupts the processing of a task at a predetermined time $T_1$ during a full time cycle $T_0$–$T_2$ rendering the CPU unavailable for a predetermined period of time ($T_1$ to $T_2$) which represents a predetermined percentage of the CPUs full computing power. The task that is interrupted is continued at the start of the next time cycle of the CPU so that all tasks are completed. The power of any CPU so hobbled may be decreased by a predetermined percentage of full power by decreasing the processing time cycle between $T_0$ and $T_1$, without the need for hardware or operating system modification.

8 Claims, 6 Drawing Sheets

```
+---------------------+=====================+
T0    Available Time    T1   Unavailable Time   T2
         Interval              Interval

:                          :

+---------+------+-------+=====================+
T0          Tx IPC Ty     T1   Unavailable Time   T2
    Available      Time
```

FIG. 5

```
+----------+==========+----------+==========+
T0  Avail  T1 Unavail T2   Avail  T3 Unavail T4
```

FIG. 6

```
+----------+==========+----------+==========+
T0  Avail  T1 Unavail T2   Avail  T3 Unavail T4

:          :          :          :          :

+----------+====+--+======+---------+==========+
T0  Avail  T1   Tx Ty     T2        T3 Unavail T4
                U  I      U         A
                n  P      n         v
                a  C      a         a
                v         v         i
                a         a         l
                i         i
                l         l
```

FIG. 7

```
+-----------+==========+----------+==========+
T0    Avail  T1  Unavail T2   Avail   T3  Unavail T4

:           :           :           :           :

+-----------+========+---+==+-------+==========+
T0    Avail  T1         Tx  Ty T2       T3 Unavail T4
             U          I   U     A
             n          P   n     v
             a          C   a     a
             v              v     i
             a              a     l
             i              i
             l              l
```

FIG. 8

```
+-------------+===========+----------+===========+
T0    Avail  T1  Unavail T2    Avail   T3  Unavail T4

:           :            :           :

+-------------+========+xxxxxxxxxxxxxxxxxx+----------+
T0    Avail  T1 Un-   Tx  Memory dump     Ty   Avail  T3
                avail                     T2
```

FIG. 9

```
+----------+==========+----------+==========+
T0    Avail   T1  Unavail T2    Avail    T3  Unavail  T4

:            :          :           :

+----------+--+==========+----------+==========+
T0    Avail   Tx Ty Unavail   T2 Avail   T3 Unavail   T4
              I  T1
              P
              C
```

FIG. 10

```
+----------+==========+----------+==========+
T0    Avail   T1  Unavail T2    Avail    T3  Unavail  T4

:            :          :           :

+--------+xxxxxxxxxxxxxxxxxxxxxxx+==========+----------+
T0 Avail Tx   Memory dump         Ty Unavail  T2  Avail   T3
                                  T1
```

FIG. 11

METHOD AND APPARATUS FOR CONTROLLING AVAILABLE PROCESSOR CAPACITY

FIELD OF THE INVENTION

The present invention generally relates to controlling a processor and, more particularly, it relates to controlling the available capacity of a processor in a system.

BACKGROUND OF THE INVENTION

Although seemingly unusual, there are situations in practice where it is important that the available capacity of a processor (e.g. CPU) be limited within a system. This situation occurs, for example, when a user, purchasing processing capacity per unit processor, desires processing capability less than the full capacity of a single processor (i.e., some fraction of a unit) due to perhaps cost concerns.

One technique for controlling processor capacity within a system includes varying the frequency of the system clock. (Generally, system clocks can be decreased in frequency but not increased as systems are designed with worse case propagation delays in mind.) Decreasing clock frequency, however, changes not only total system capacity but also the processor time to do a fixed amount of work. A significant drawback of this technique is that changing the system clock frequency changes the capacity of all processors in the system and often adversely impacts the input/output capacity of the system.

Another technique for controlling processor capacity is to use processor microcode to control instruction rate. This will also change processor time. Different microcode can be used in each processor in the system but this compounds the processor time problem.

Still another technique uses physically different processors configured in one system, but, practically speaking, this is essentially the same as using different microcode.

SUMMARY OF THE INVENTION

The present invention involves limiting the available capacity of a processor (e.g., CPU) by alternately making it available and unavailable for tasks. The invention includes a process for wasting time and a process for managing and scheduling tasks such that, when a CPU is to be made unavailable for tasks, the scheduling process causes the time wasting process to execute on the CPU.

BRIEF DESCRIPTION OF THE FIGURES

The aspects, features and advantages of the present invention will be more readily understood from the following detailed description when read in conjunction with the accompanying drawings, in which.

DETAILED DESCRIPTION OF THE DRAWINGS

Overview

Figure 1:
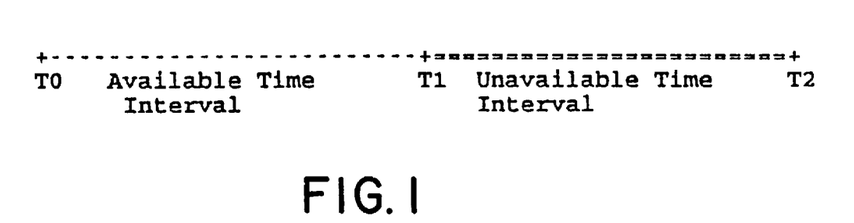
FIG. 1 shows a timeline generally indicating the available and unavailable time periods of a reduced capacity processor.

The present invention involves intentionally limiting the available capacity of a processor within a system by controlling the amount of time the processor is available for performing tasks (e.g., system or user stacks). As shown in FIG. 1, a complete cycle of time is the interval (or time period) from time T0 to time T2. In the exemplary embodiment of the present invention, the time duration from T0 to T2 is approximately 10 to 200 milliseconds.

The time from T0 to T1 is an available time interval and the time T1 to T2 is an unavailable time interval. The available time interval is when the processor can be used. When the available time interval is 50% of the complete cycle interval, the processor can be used 50% of the time. In the example of FIG. 1, the effective or usable capacity of the processor is 50% of its full capacity.

In the exemplary embodiment of the present invention, the ability to control individual processor availability is derived from a scheduling process which is executing continuously. The scheduling process, which implements a basic priority scheme, directs processors, designated as reduced capacity processors, to execute a high priority task which, at least in part, is essentially for wasting time. This high priority task for wasting time is designed to execute for predetermined amounts of time in order to effectively control the percentage by which the available capacity of a processor is reduced.

If more than one processor is configured in the system, the present invention allows for the capacity of each processor to be controlled separately. For example, if system specifications call for processing capability equivalent to 1½ processors, with the present invention, two processors can be configured such that one is at full capacity and the other at half capacity or both can be configured to operate at ¾ capacity.

Exemplary Embodiment

Figure 2:
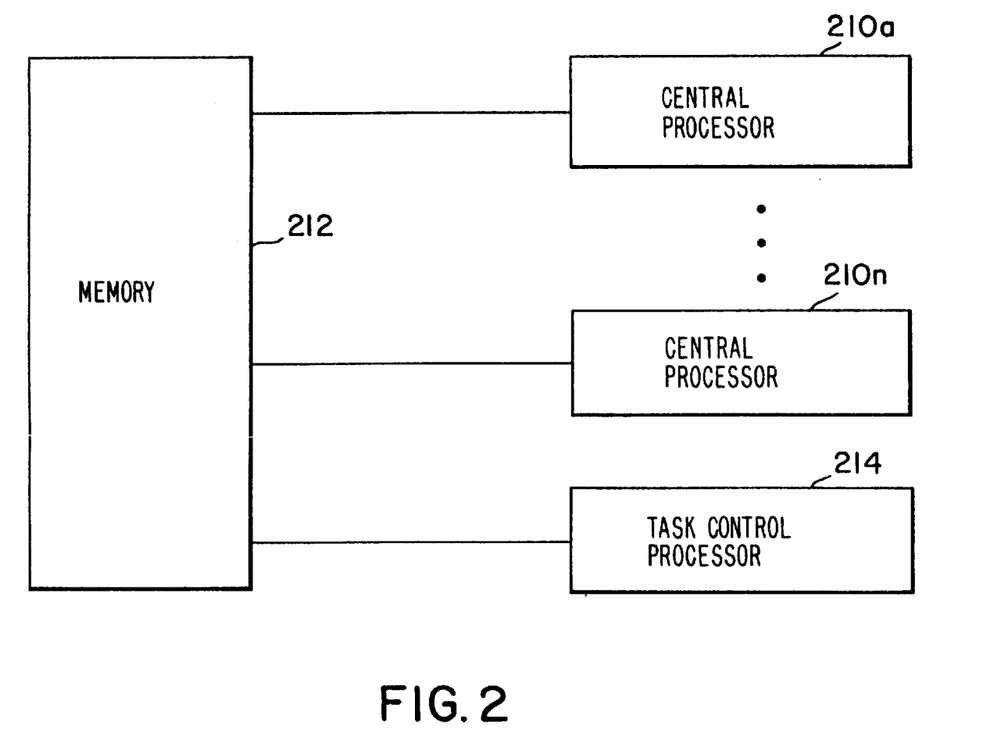
FIG. 2 shows a high level functional block diagram of an exemplary system on which the present invention is implemented.

FIG. 2 shows a high level functional block diagram of a system on which an exemplary embodiment of the present invention is implemented. In FIG. 2, there is at least one central processor unit (CPU) 210a. In the exemplary embodiment of the present invention, the CPU 210a is the unit on which user and operating system tasks are executed. CPU 210a is coupled to a main memory 212.

In addition, as shown in FIG. 2, a task control processor (TCP) 214 is also coupled to main memory 212. In the exemplary embodiment of the present invention, the TCP 214 is responsible for task and processor scheduling. The CPU 210a and TCP 214 can communicate by way of messages passed via main memory 212.

In the exemplary embodiment, certain functions such as inter-processor communication (IPC) and memory dumps are handled by a special process running on a CPU 210a. In the exemplary embodiment of the present invention, this process is known as the answering service process.

Each CPU 210a–210n has an individual answering service process associated with it. Although normally processes or tasks can execute on any available processor, the answering service process only executes on its respective CPU 210a. The scheduling process, in the exemplary embodiment, executes on the TCP 214.

In the exemplary embodiment of the present invention, as mentioned, TCP 214 is the processor on which the scheduling process executes. Although some details of TCP 214 and its scheduling functions are described herein, U.S. Pat. Nos. 4,779,194, 4,796,178 and 5,010,482 describe additional detail and are herein incorporated by reference.

When a particular answering service process is ready to execute, the scheduling process running on TCP 214 starts it executing on its associated processor. As the answering service process is high priority, it preempts most any task that may be executing on the processor at that time.

When the answering service process first starts, it determines if it is running on a full capacity processor or on a reduced capacity processor. On a full capacity processor, a first branch of the answering service process is used. On a reduced capacity processor, a second branch of the answering service process is used. It is within this second branch of the answering service process where the individual processor CPU 210a is effectively taken off-line for a predetermined amount of time. The second branch of the answering service process is also referred to as the "soaker" process.

In the exemplary embodiment of the present invention, a procedure called CPUHOBBLED is called to determine which branch of the answering service process to use and at what percentage of full capacity a processor is designated to operate.

The psuedo-code for the answering service process is as follows:

```
IF NOT CPUHOBBLED (EMODE_MACHINEINFO2, HOBBLE_FACTOR)
THEN
      <Regular Process>
   ELSE
      <"Soaker" Process>
```

As shown below, several initialization calculations are performed in preparation for executing the second branch of the answering service process.

1. CPUHOBBLED determines if the CPU is a reduced capacity processor via EMODE_MACHINEINFO2 and if so, returns available capacity, as a percentage, in HOBBLE_FACTOR. This is converted to the ratio of the complete cycle interval and the available interval which simplifies the other calculations.

HOBBLE_FACTOR:=100/MAX(HOBBLE_FACTOR,1);

2. The end of the first available interval (T1) is calculated as CLOCK+5 SECONDS and stored in AVAIL_END. A long first available interval allows full processor capacity during early initialization or just after the processor has been acquired into the partition.

3. The end of the first unavailable interval (T2), which is also the end of the first cycle, is made the same as the end of the first available interval and is stored in CYCLE_END.

After the above initialization calculations, the "soaker" aspect can now function.

Referring back to normal operation, the first branch of the answering service process, represented below, is a loop which responds to memory dump requests and IPC requests.

```
WHILE BOOLEAN (MYUSAGE.WRONGNUMBER) DO
   BEGIN
   WAITANDRESET (LISTEN_EVENT[CPMNO]);
   CHECKANDHANDLEDUMPS;
   LISTEN;
   END;
```

This loop continues to use the full capacity of enabled processors. The answering service process, once started, waits (via a WAITANDRESET) on a LISTEN_EVENT of its respective processor. When awakened, ANSWERINGSERVICE first checks to see if the processor is needed for a memory dump. ANSWERINGSERVICE next calls the LISTEN procedure to handle inter-processor communication. ANSWERINGSERVICE loops by doing the wait, the memory dump check, and the call on LISTEN until it is informed that its processor is no longer in the partition. This general implementation of ANSWERINGSERVICE is referred to as the first branch of the answering service process. The processor time consumed by this process is accumulated in a system wide account "listen" (LISTENCLOCKX).

As mentioned, in the exemplary embodiment of the present invention, a second branch of the answering service process has been developed to control processors that are designated to run at a reduced capacity.

The second branch has two major functions. First, it performs the same functions as the first branch of the answering service process of answering memory dump requests and inter-processor communication (IPC) requests. Second, it has the added responsibility of providing reduced capacity by making a specified percentage of processor time unavailable to other processes. Although, it should be noted that, in the exemplary embodiment of the present invention, even while the processor is so-called "unavailable", memory dump and IPC requests are responded to as described below.

In general, the method employed by the second branch of the answering service process for limiting processor capacity is to alternately make the processor available for processing and not available for processing as illustrated in FIG. 1. In the exemplary embodiment of the present invention, this technique is applied on a per processor basis. Therefore, in a multiple processor environment, all processors can be operating with different effective capacities.

Figure 3:
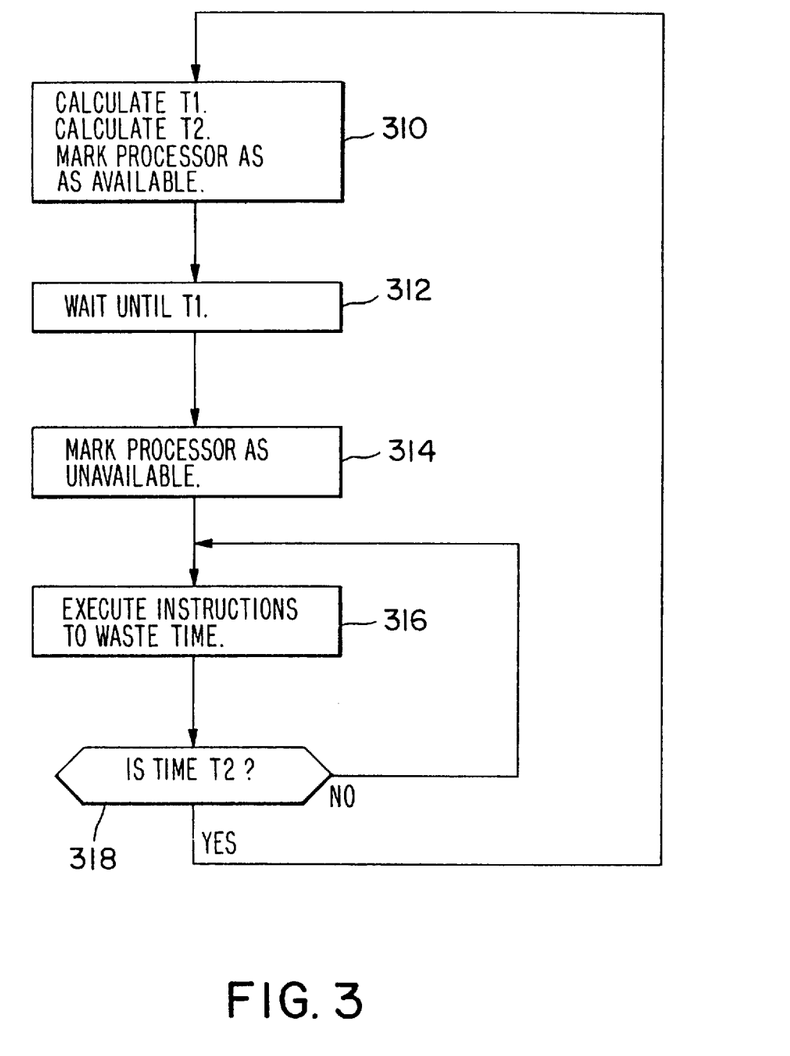
FIG. 3 shows a flowchart illustrating the high-level functional steps performed when controlling the capacity of one of the processors in FIG. 2.

FIG. 3 is a flowchart illustrating a high level flow for the capacity control process illustrated in the time line of FIG. 1. As shown, at step 310, times T1 and T2 are calculated and the processor is marked as available. At step 312, the process waits until T1 then marks the processor as unavailable at step 314. When the processor is marked as unavailable, it executes a set of predetermined instructions to waste time, step 316. Finally, at step 318, the time is checked: if it is T2, the the process loops back to step 310, otherwise the process loops back to step 316 to waste more time.

By definition, processor time spent performing answering service functions (IPCs and memory dumps) is considered available time. However, in the exemplary embodiment of the present invention, requests to perform answering service functions can occur at any time. That is to say, a request can start or end during what otherwise would be unavailable time. For example, when the processor time needed for inter-processor communication over extended periods of time exceeds the time available on a reduced capacity processor, inter-processor communication receives all the time that it needs. On balance, in the exemplary embodiment, it was determined that it is better to delay the enforcement of capacity reduction rather than delay inter-processor communication.

In the exemplary embodiment, processor time spent performing answering service functions during what should be unavailable time is borrowed from the next available interval. This is done, for example, by extending the end point (time T2) of the current unavailable interval and shortening the next available interval by the same amount. To handle this situation, special case handling of this type of situation is built into the second branch of the answering service process.

Figure 4:
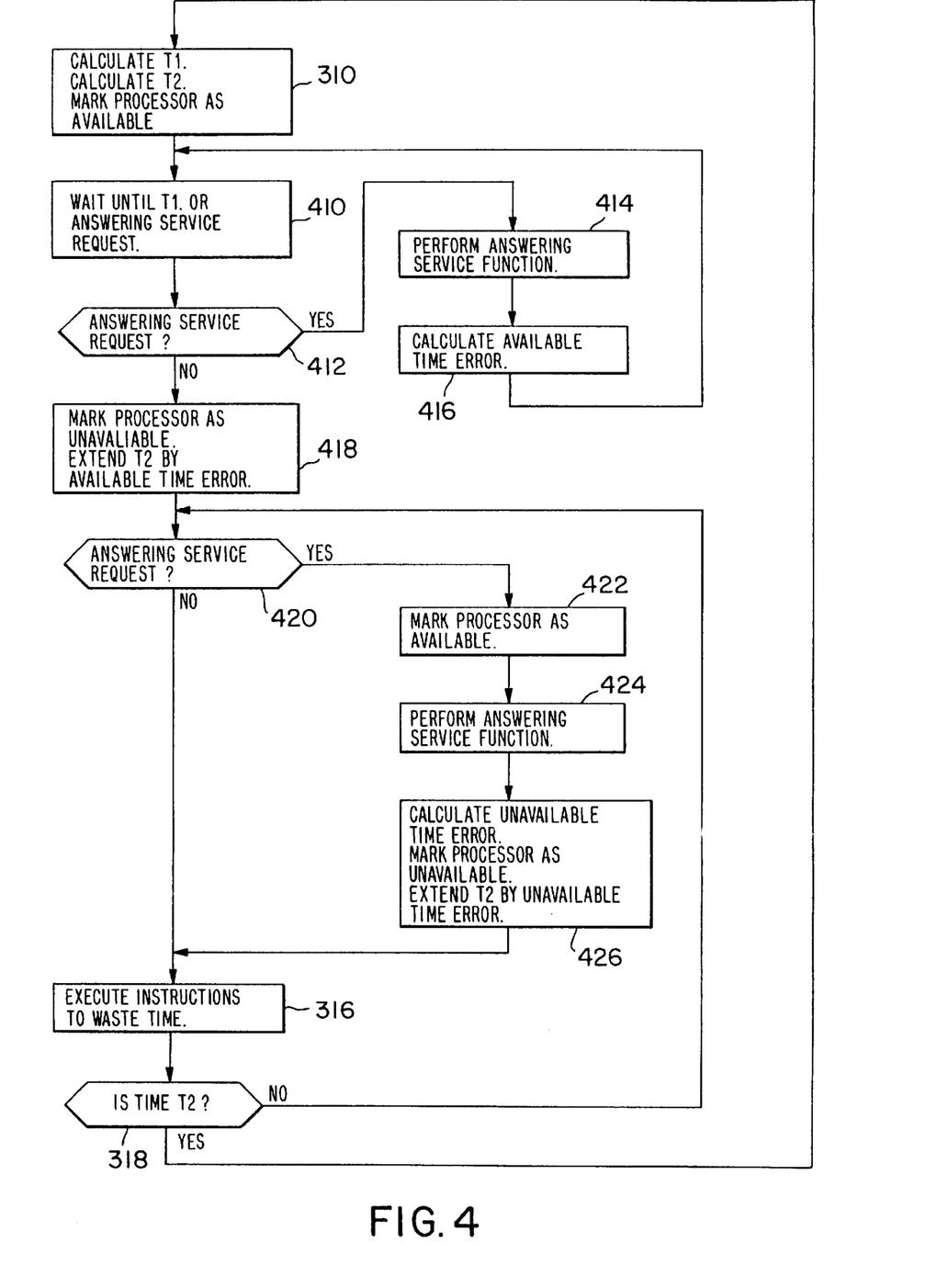
FIG. 4 shows the flowchart of FIG. 3 with additional detail for handling special cases.

FIG. 4 shows the flowchart of FIG. 3 modified to include the special case where available time is borrowed from subsequent intervals. As shown in FIG. 4, after step 310, the process waits for either T1 (like step 312 of FIG. 3) or an answering service request, step 410. If there is an answering service request, step 412, then the process performs the request and calculates the available time error, steps 414 and 416. After performing the request, the process branches back to step 410.

The available time error shown in FIG. 4 is the amount of time beyond time T1 spent performing an answering service function. The unavailable error in FIG. 4 is the amount of time during an unavailable interval (the time before time T2) spent performing an answering service function. The next available interval is shortened by the sum of the available time error and the unavailable time error.

The general outline of the second branch of the answering service process is represented below:

```
WHILE BOOLEAN (MYUSAGE.WRONGNUMBER) DO
    IF WAITANDRESET (((AVAIL_END – CLOCK)/ONESECOND),
                LISTEN_EVENT[CPMNO]) EQL 1 THEN
        BEGIN % TIME WAKE UP
        <Unavailable time process>
        END
    ELSE
        BEGIN % EVENT WAKE UP
        <IPC or Memory dump during available time>
        END
```

As seen, the second branch also has branches which allow the process to wake up on time or to wake up on an event. In the exemplary embodiment, the TCP 214 wakes up the answering service process and informs it whether the wake up is due to time or an event. The WAITANDRESET portion is essentially the available time period. The wake up on time is essentially the unavailable time period where the wake up on event is, for example, an IPC request during an available time period. When this branch wakes up on an event, checks for a memory dump and/or IPC requests are made. There are also some additional steps.

In the exemplary embodiment of the present invention, because ANSWERINGSERVICE initially sets a utilization class to LISTENCLOCKX, one of the first steps performed by the second branch is to change the utilization class to BLACKHOLECLOCKX and the last thing it does is change the utilization class back to LISTENCLOCKX. It should be noted that the utilization class, however, is changed to LISTENCLOCKX for the IPC request processing and then back to BLACKHOLECLOCKX.

As described above with reference to FIG. 4, answering service requests may occur or extend into an otherwise unavailable time period. For example, if an IPC request extends into an unavailable interval, the amount of the intrusion is calculated and stored in AVAIL_ERR. The store of CLOCK into CLK establishes the end of the IPC period (Ty).

An exemplary psuedo-code for the wake up on event branch is shown below.

```
BEGIN % EVENT WAKE UP
CHECKANDHANDLEDUMPS;
AVAIL_ERR:=–MAX (AVAIL_END, CLOCK);
SET_TCP_CLASS (SNR, PIB, LISTENCLOCKX, 0);
LISTEN;
SET_TCP_CLASS (SNR, PIB, BLACKHOLECLOCKX, 0);
AVAIL_ERR:=*+MAX (AVAIL_END, CLK);
END
```

Waking up on time, signals the end of an available interval and the start of an unavailable interval (e.g., T1). The unavailable time process has three parts.

1. Initialization involves any needed adjustment to the end of the unavailable interval (T2). The adjustment is the result of intrusion into the unavailable interval by the preceding available interval. The adjustment is limited to a maximum value of the length of an available interval.
2. The process loops checking for the end of the unavailable interval, a memory dump request, and an IPC request. The time consumed by IPC that occurs before the original end of the unavailable interval will extend the unavailable interval. This time is borrowed from the next available interval.
3. The end of the unavailable interval is the end of a cycle. New values for the length of an available interval, the end of the next available interval, and the end of the next unavailable interval are calculated.

An exemplary psuedo-code for the wake up on time branch is shown below.

```
BEGIN % TIME WAKE UP
    CLK:=CLOCK;
    IF AVAIL_ERR EOL 0 THEN
        CYCLE_END:=*+MAX(MIN((CLK-
AVAIL_END) ,NOMINAL_AVAIL) ,0);
    AVAIL_ERR:=MIN (AVAIL_ERR, NOMINAL_AVAIL);
    CYCLE_END:=*+AVAIL_ERR;
    WHILE CLK LSS CYCLE_END + LISTEN_ERR DO
        BEGIN
        THRU 600 DO
            BEGIN
            PURGE_ACAM;
            CHECKANDHANDLEDUMPS;
            IF COMWORD[CPMNO] ISNT 0 THEN
                BEGIN
                LISTEN_ERR:=-MIN (CLOCK, CYCLE_END);
                SET_TCP_CLASS (SNR, PIB, LISTENCLOCKX, 0);
                LISTEN;
                SET_TCP_CLASS (SNR, PIB, BLACKHOLECLOCKX, 0);
                LISTEN_ERR:=*+MIN (CLOCK, CYCLE_END);
                END;
            END;
        CLK:=CLOCK;
        END;
    NOMINAL_AVAIL:=ONESECOND DIV SBPSLICERATE;
    AVAIL_END:=MIN ((CLK-(CYCLE_END+LISTEN_ERR)),
NOMINAL_AVAIL)+NOMINAL_AVAIL - AVAIL_ERR - LISTEN_ERR;
    CYCLE_END:=CLK + NOMINAL_AVAIL * HOBBLE_FACTOR;
    AVAIL_ERR:=0;
    LISTEN_ERR:=0;
    AVAIL_END:=AVAIL_END + CLOCK;
    END
```

Several statements in the code are described below.

1. The "THRU 600 DO" reduces the frequency of clock fetches which are messages to the input/output module (IOM). The value 600 was obtained experimentally. Larger values cause the reduced capacity to be greater than the specified percentage.
2. The "PURGE_ACAM" purges an associative memory (not shown) used in the exemplary embodiment of the CPU.

As described above, the technique used for reducing capacity is to alternately make the processor available for use by other processes and then make the processor unavailable.

Referring to FIGS. 5–11 examples illustrating possible scenarios are described.

Figure 5:
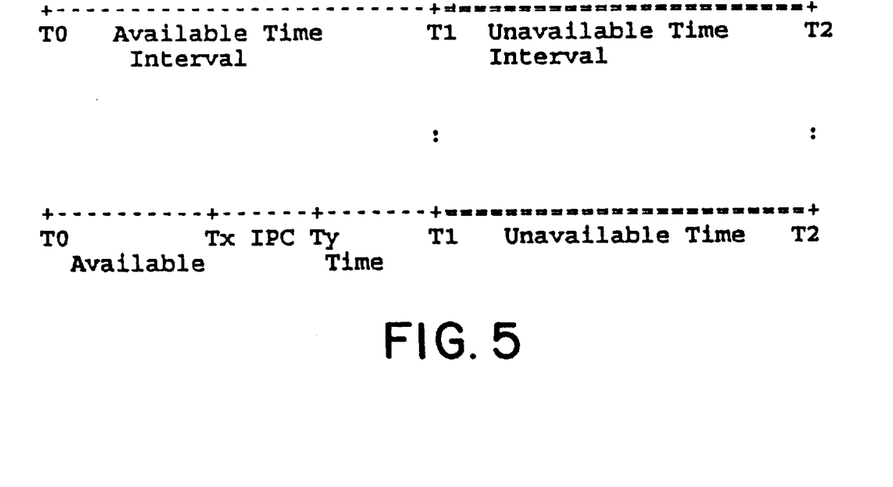
FIG. 5 shows the timeline of FIG. 1 compared to a timeline illustrating an inter-processor communication (IPC) during the available time period.

The time line of FIG. 5 shows an IPC occurring entirely during available time. The interval T0 to T1 is considered available time. Point T1 does not change just because part of the available time was used for IPC. At point T0, a "soaker" process waits on both time and its processor's listen event with the time value being the difference between T1 and T0.

At point Tx, the "soaker" process wakes up on the listen event and checks for a memory dump request and for an IPC request. At point Ty, all requests have been completed so the soaker process returns and continues to wait on time and listen event. The time value for this wait period is the difference between T1 and Ty.

The following examples require consideration of more than one cycle.

Figure 6:
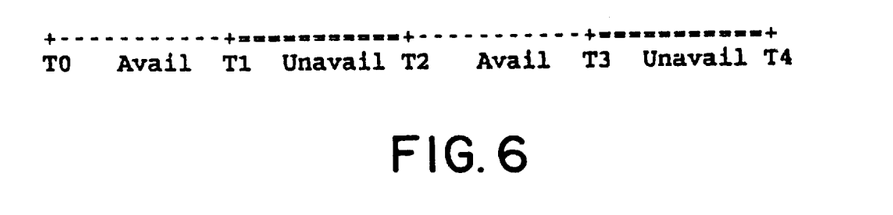
FIG. 6 shows a timeline illustrating two complete cycles of the time periods shown in FIG. 1.

The time line of FIG. 6 shows two complete cycles. The intervals T0 to T1 and T2 to T3 are available time. The intervals T1 to T2 and T3 to T4 are unavailable time.

Figure 7:
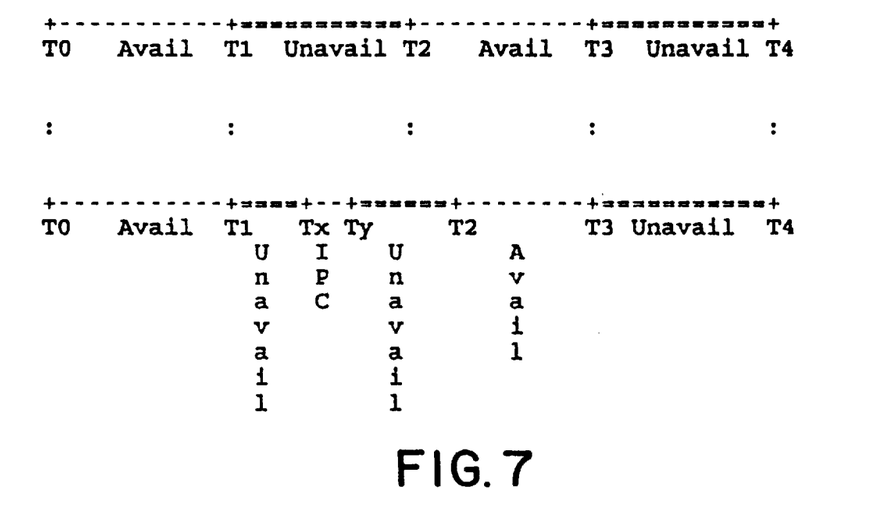
FIG. 7 shows a timeline illustrating an IPC during an unavailable time period shown in FIG. 6.

As shown in FIG. 7, if an IPC request occurs during an unavailable period, the unavailable period is suspended and restarted after the IPC completes. The IPC time is considered available time which is borrowed from the next available interval.

Figure 8:
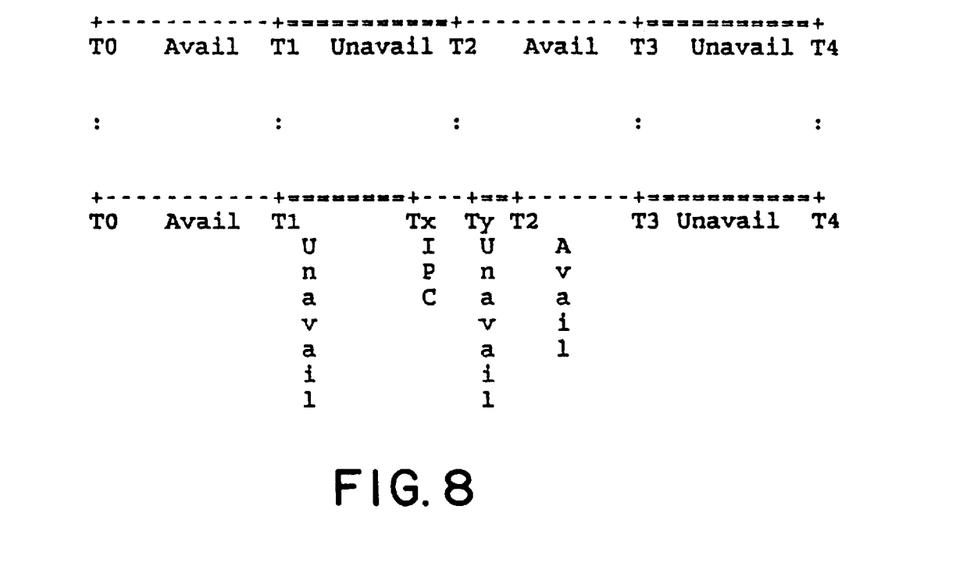
FIG. 8 shows a timeline illustrating a variation of the timeline shown in FIG. 7 where an IPC starts during an unavailable interval.

If, as shown in FIG. 8, the IPC starts during an unavailable interval but ends after the unavailable interval would have ended, only the time from when IPC starts until when the unavailable interval would have ended is borrowed. In this case, as shown in FIG. 8, point T2 is shifted to the right on the time line but never goes beyond point T3.

In the exemplary embodiment of the present invention, memory dump requests do not borrow from the next available time interval. If a memory dump request starts during an unavailable interval and completes before time T2, the unavailable period continues.

Figure 9:
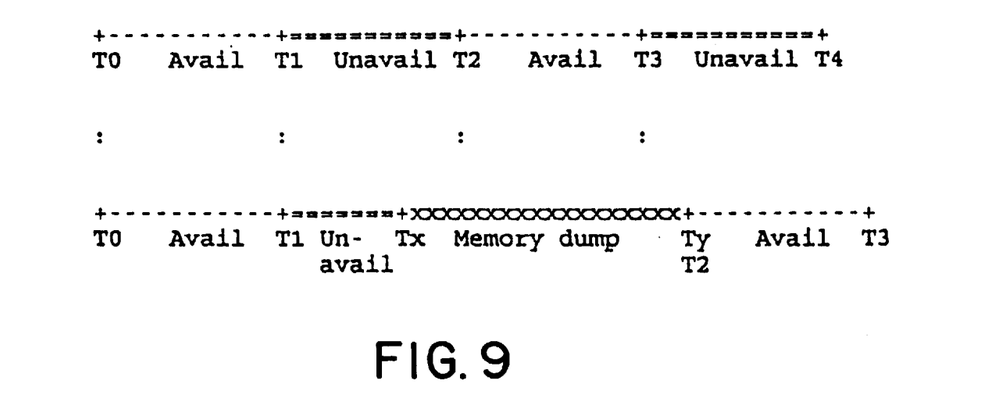
FIG. 9 shows the timeline of FIG. 6 compare to a timeline illustrating a memory dump extending from an unavailable period to an available period.

If, however, as shown in FIG. 9, the memory dump request completes after time T2, points T2 and T3 are shifted to the right such that T2 coincides with the completion of the dump.

Figure 10:
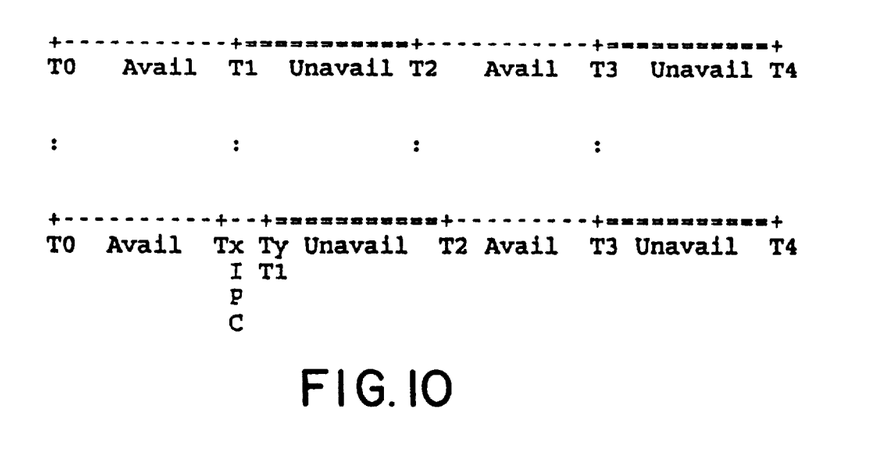
FIG. 10 shows the timeline of FIG. 6 compared with a timeline illustrating an additional example of an IPC.

As shown in FIG. 10, an IPC request which starts during an available interval at time Tx, continues until time Ty. As seen, time Ty is after what should have been the end of the available interval. The unavailable interval starts when the IPC request ends and extends into what should have been the start of the next available interval. The amount borrowed from the T2 to T3 available interval is equivalent to the amount added to the T0 to T1 available interval.

Figure 11:
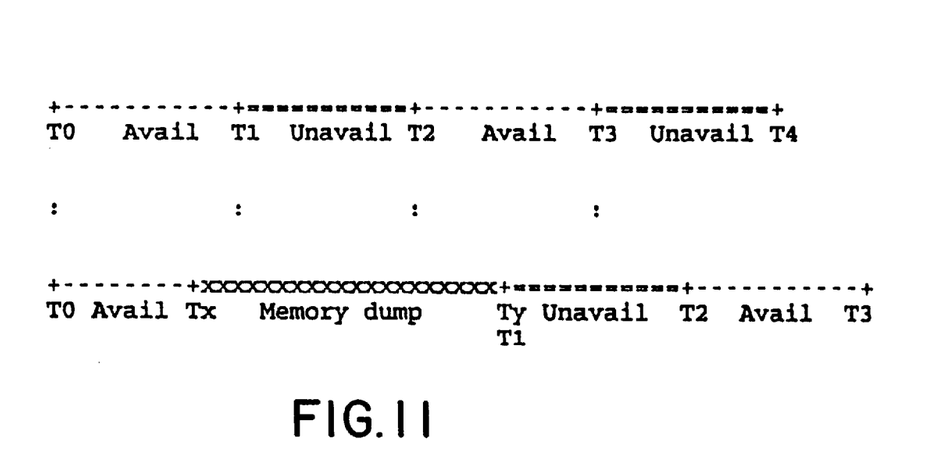
FIG. 11 shows the timeline of FIG. 6 compared with a timeline illustrating an additional example of a memory dump which extends from an available interval to an unavailable interval.

As shown in FIG. 11, a memory dump request starts during an available interval and effectively ends the available interval. At the completion of the memory dump, the next unavailable interval starts. Time is not borrowed from the available interval T2 to T3.

It should be noted that, in the above examples, the description of each scenario is examined in isolation. In practice, however, multiple IPC requests are generally handled during each complete cycle.

It should also be noted that cycle time (i.e., available time versus unavailable time) has a direct impact on system performance. If the cycle time is too long, an interactive application might exhibit very choppy response times. If the cycle time is too short, the overhead of stack switching for CPUs 210 can become significant since a process switch occurs at points T0, T1 and T2.

In addition to cycle time, slice rate can have a similar impact on system performance as the cycle time. TCP 214, in the exemplary embodiment, switches between tasks of equal priority based on the slice rate. Presently, the slice rate is limited to the range of 10 to 200 slices per second with a default of 60. The available time will be the same as the slice time, which will fall in the range of 5 to 100 milliseconds.

In the exemplary embodiment of the present invention, processor time is accounted for. For the regular answering service process, processor time is accumulated in a "listen" utilization account. For, the "soaker" process, processor time is accumulated in a "reduce capacity" utilization class. In the exemplary embodiment, the accounting for processor utilization by class is done by the TCP 214. It should be noted that, to accurately track how much time a processor is available, the soaker process changes the utilization class to "listen" before calling LISTEN and changes the utilization class back to "reduce capacity" after returning from LISTEN.

Processor resource utilization can be reported in many ways. It can be reported through an operator interface. It can also be retrieved programmatically through operating system interfaces (e.g., GETSTATUS and SYSTEMSTATUS).

It should be noted that, in the exemplary embodiment of the present invention, each processor in the system of FIG. 2 has associated with it a style PROM on a state access module (SAM) card (not shown). Among the many items contained in the style PROM is an indicator that designates the associated processor as full capacity or reduced capacity. When the processor is initialized, the capacity indicator is moved into a processor identification state which is accessed when the determination is needed.

The present invention, in its exemplary form, although employed on the Unisys A series computer systems (e.g., A19 series), has applicability to many other computer systems.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. In a multi-processing system including CPUs for performing operating system tasks and user tasks from a main memory, a system for limiting the availability of each CPU to perform said tasks during a predetermined portion of each time cycle $T_0$ to $T_2$ comprising:

task control processor means for scheduling tasks to be executed by each CPU;

means executable on the CPUs for interrupting an active task at a predetermined time $T_1$ during said time cycle $T_0$ to $T_2$.

said means executable on a CPU comprising means for intentionally ceasing processing of an active task at said predetermined time $T_1$, of a time cycle and subsequently continuing said active task at time $T_0$, and each said CPU being responsive to the means executable on said CPUs for intentionally curtailing the availability of the CPU to perform operating system task and user tasks for the fixed time $T_1$ to $T_2$ in each time cycle.

2. The system of claim 1, wherein the means for intentionally ceasing processing comprises a high priority process task designed, at least in part, to consume a predetermined amount of time.

3. The system of claim 2, wherein the high priority process task, in addition to consuming a predetermined amount of time, is also employed for conducting inter-processor communication and memory dumps.

4. The system of claim 1, having a plurality of CPUs wherein each CPU is individually designated as a full capacity processor or a reduced capacity processor and said means executable on a CPU for ceasing processing executes only on those CPUs designated as reduced capacity processors.

5. In a multi-processing system including a plurality of CPUs for performing user tasks and operating system tasks from a main memory, a method for limiting the availability of each of the CPUs to perform said tasks during a predetermined portion of each time cycle $T_0$ to $T_2$, comprising the steps of:

executing a task control processing means in the processing system for scheduling task to be executed by the CPUs;

executing a particular CPU task designed for intentionally interrupting processing of active tasks at a predetermined time $T_1$ during each time cycle for consuming time until $T_2$;

resuming said interrupted task at the start of the next time cycle; and intentionally limiting by way of the scheduled task and the particular task, the availability of any of the CPUs to perform user tasks and operating system tasks during the time $T_1$ to $T_2$.

6. The method of claim 5, wherein the particular CPU task for reducing capacity comprises a high priority task relative to other process tasks being scheduled.

7. The method of claim 5, wherein the system includes a plurality of CPUs, further comprising the steps of designating each of the CPUs, individually, as fall capacity or reduced capacity; and executing a separate capacity-reducing process on only those CPUs designated as reduced capacity CPUs.

8. In a multi-processing system including a plurality of CPUs operable to run tasks assigned by a controller, comprising:

each said CPU having a full cycle time $T_0$ to $T_2$ for performing both operating system tasks and user program tasks, each said CPU further having a programmable and unique program for intentionally howling the full capacity of the CPU by a fixed and predetermined percentage;

a main memory for storing tasks being shared by said CPUs and providing the communication path between said CPUs, a task control processor for scheduling tasks to be executed by the CPUs daring said cycle times $T_0$ to $T_2$, said program for hobbling each said CPU comprising means executed on each CPU for intentionally preventing each said CPU during a predetermined portion of $T_1$ to $T_2$ of each said cycle time $T_0$ to $T_2$ from performing said scheduled user tasks by a fixed and predetermined percentage of full capacity of the processing time, and subsequently performing the task interrupted at $T_1$, whereby, the hobbling program means intentionally causes a reduction in the processing capacity of the individual CPUs from the full capacity by a predetermined percentage equal to $(T_2-T_1/T_2-T_0) \times 100$.

* * * * *